(12) United States Patent
Costello

(10) Patent No.: US 10,077,100 B1
(45) Date of Patent: Sep. 18, 2018

(54) PROPELLER DRIVING ASSEMBLY

(71) Applicant: Thomas J. Costello, Sullivan, MO (US)

(72) Inventor: Thomas J. Costello, Sullivan, MO (US)

(*) Notice: Subject to any disclaimer, the term of this patent is extended or adjusted under 35 U.S.C. 154(b) by 0 days.

(21) Appl. No.: 15/380,576

(22) Filed: Dec. 15, 2016

(51) Int. Cl.
| | | |
|---|---|---|
| *B63H 23/30* | (2006.01) | |
| *B63H 23/34* | (2006.01) | |
| *B63H 23/08* | (2006.01) | |
| *F16H 1/20* | (2006.01) | |
| *F16D 41/12* | (2006.01) | |
| *F16D 41/066* | (2006.01) | |

(52) U.S. Cl.
CPC ............. *B63H 23/30* (2013.01); *B63H 23/08* (2013.01); *B63H 23/34* (2013.01); *F16D 41/066* (2013.01); *F16D 41/12* (2013.01); *F16H 1/203* (2013.01)

(58) Field of Classification Search
CPC ............ B63H 2033/0258; B63H 23/30; B63H 23/0258; B63H 2023/0291
See application file for complete search history.

(56) References Cited

U.S. PATENT DOCUMENTS

| | | | |
|---|---|---|---|
| 983,864 A | 2/1911 | Smith | |
| 1,227,456 A | 5/1917 | Lafitte | |
| 1,269,531 A | 6/1918 | Gargett | |
| 1,428,257 A | 9/1922 | Roth | |
| 1,846,187 A | 2/1932 | Coulter | |
| 1,883,966 A * | 10/1932 | Krause | F16D 41/12 192/46 |
| 1,903,350 A | 4/1933 | Landrum | |
| 2,152,409 A | 3/1939 | Holtz | |
| 2,372,247 A | 3/1945 | Billing | |
| 3,392,603 A | 7/1968 | Sanders | |
| 3,486,478 A * | 12/1969 | Halliday | B63H 5/125 440/58 |
| 4,016,825 A | 4/1977 | Pichl et al. | |
| 4,489,816 A * | 12/1984 | Sigg | B63H 23/30 192/109 F |
| 5,024,639 A * | 6/1991 | Crispo | B63H 5/10 440/58 |
| 5,070,978 A * | 12/1991 | Pires | F16D 41/12 192/45.1 |
| 5,501,623 A * | 3/1996 | Bowen, III | B63H 5/10 440/75 |
| 5,597,057 A * | 1/1997 | Ruth | F16D 41/12 188/82.8 |
| 2007/0125192 A1* | 6/2007 | Mowbray | B63H 20/14 74/336 R |

(Continued)

*Primary Examiner* — William Kelleher
*Assistant Examiner* — Gregory T Prather
(74) *Attorney, Agent, or Firm* — Grace J. Fishel

(57) ABSTRACT

A propeller driving assembly connected to an input shaft that is coupled to an engine is disclosed which has a roller clutch having an inner race and an outer race with the outer race connected to the input shaft, a release clutch connected to the input shaft, the release clutch having a ratchet wheel having a notch and a flyweight assembly for engaging or disengaging the notch, an outer shaft connected to the release clutch and the outer race, the outer shaft having a lower end connected to a first bevel gear, an inner shaft connected to the input shaft and the inner race, the inner shaft having a lower end connected to a second bevel gear, and a propeller shaft connected to the first bevel gear and the second bevel gear.

17 Claims, 4 Drawing Sheets

(56) References Cited

U.S. PATENT DOCUMENTS

2007/0218786 A1* 9/2007 Tamba ................... B63H 20/20
                                                                 440/86
2008/0070739 A1* 3/2008 Nakamura ............... B63H 5/10
                                                                 475/269

* cited by examiner

PROPELLER DRIVING ASSEMBLY

BACKGROUND

This disclosure relates generally to a driving unit for propelling a vehicle, and more particularly to a propeller driving assembly for rotating a propeller of a vehicle at different speeds having an automatic shifting mechanism.

Typically, a marine engine is connected to a propeller through a gear box. The engine drives the propeller and the speed of the propeller is proportional to the speed of the engine. The propeller is capable of spinning at a speed over a particular range. However, there are various tradeoffs in engine designs that need to be considered. An engine designed for maximum speed does not provide low speed acceleration. Also, an engine designed for maximum low speed acceleration does not provide high speed performance. In order to design an engine that provides both low speed acceleration and high speed performance a multi-speed transmission may be used to obtain rapid acceleration so that the boat will reach the planing position for better fuel economy. A multi-speed transmission may have a low gear setting that is used to improve acceleration at low speeds and a high gear setting that is used to maintain top speed. Although multi-speed transmissions are useful, such transmissions require complex programmable electrical controllers and sensors to shift from one gear to another. These multi-speed transmissions also require driver interaction to switch from one gear to another.

The present disclosure is designed to obviate and overcome many of the disadvantages and shortcomings experienced with prior multi-speed transmission systems. Moreover, the present disclosure is related to a propeller driving assembly that automatically shifts between gears without the need for any complex electrical sensing systems. The propeller driving assembly of the present disclosure is also simple to use and automatically shifts from one gear to another without requiring any driver intervention.

SUMMARY

In one form of the present disclosure, a propeller driving assembly connected to an input shaft that is coupled to an engine is disclosed which comprises a roller clutch having an inner race and an outer race with the outer race connected to the input shaft, a release clutch connected to the input shaft, the release clutch having a ratchet wheel having a notch and a flyweight assembly for engaging or disengaging the notch, an outer shaft connected to the release clutch and the outer race, the outer shaft having a lower end connected to a first bevel gear, an inner shaft connected to the input shaft and the inner race, the inner shaft having a lower end connected to a second bevel gear, and a propeller shaft connected to the first bevel gear and the second bevel gear.

In another form of the present disclosure, a propeller driving assembly connected to an input shaft that is coupled to an engine comprises a one-way roller sprag clutch having an inner race and an outer race with the outer race connected to the input shaft, a release clutch connected to the input shaft, the release clutch having a ratchet wheel having a number of notches and a number of flyweight assemblies each for engaging or disengaging the notches, an outer shaft connected to the release clutch and the outer race, the outer shaft having a lower end connected to a first bevel gear, the flyweight assemblies disengaging from the notches when the outer shaft reaches a predetermined speed of rotation, an inner shaft connected to the input shaft, the inner shaft having a lower end connected to a second bevel gear, and a propeller shaft connected to the first bevel gear and the second bevel gear.

In still another form of the present disclosure, a propeller driving assembly connected to an input shaft that is coupled to an engine comprises a one-way roller sprag clutch having an inner race and an outer race with the outer race connected to the input shaft, a release clutch connected to the input shaft, the release clutch having a ratchet wheel having a plurality of notches and a plurality of flyweight assemblies with each of the flyweight assemblies for engaging or disengaging one of the notches with the flyweight assemblies being positioned on a lower plate member, an outer shaft connected to the release clutch and the outer race, the outer shaft having a lower end connected to a first bevel gear, an inner shaft connected to the input shaft and the inner race, the inner shaft having a lower end connected to a second bevel gear, and a propeller shaft connected to the first bevel gear and the second bevel gear.

In light of the foregoing comments, it will be recognized that the propeller driving assembly of the present disclosure provides for automatic shifting which can be easily employed with highly reliable results.

The present disclosure provides a propeller driving assembly that may be used to increase fuel efficiency and reduce engine wear.

The present disclosure provides a propeller driving assembly that does not require any driver intervention to switch from one gear to another.

The present disclosure provides a propeller driving assembly that can provide more rapid acceleration and reach earlier planing than that of a single speed transmission.

The present disclosure is directed to a propeller driving assembly that has a high gear and a low gear that provides improved acceleration at low speeds using the low gear.

The present disclosure also provides a propeller driving assembly that a low gear that is useful for low speed operation such as docking or trolling.

The present disclosure further provides a propeller driving assembly that has a low gear that allows for slower idle speeds which provides enhanced boat control for docking or trolling.

The present disclosure provides a propeller driving assembly that can be constructed using readily available materials and components.

The present disclosure also provides a propeller driving assembly that has a high gear for attaining maximum speed for high speed performance.

These and other advantages of the present disclosure will become apparent after considering the following detailed specification in conjunction with the accompanying drawings, wherein:

DETAILED DESCRIPTION OF THE PREFERRED EMBODIMENTS

Figure 1:
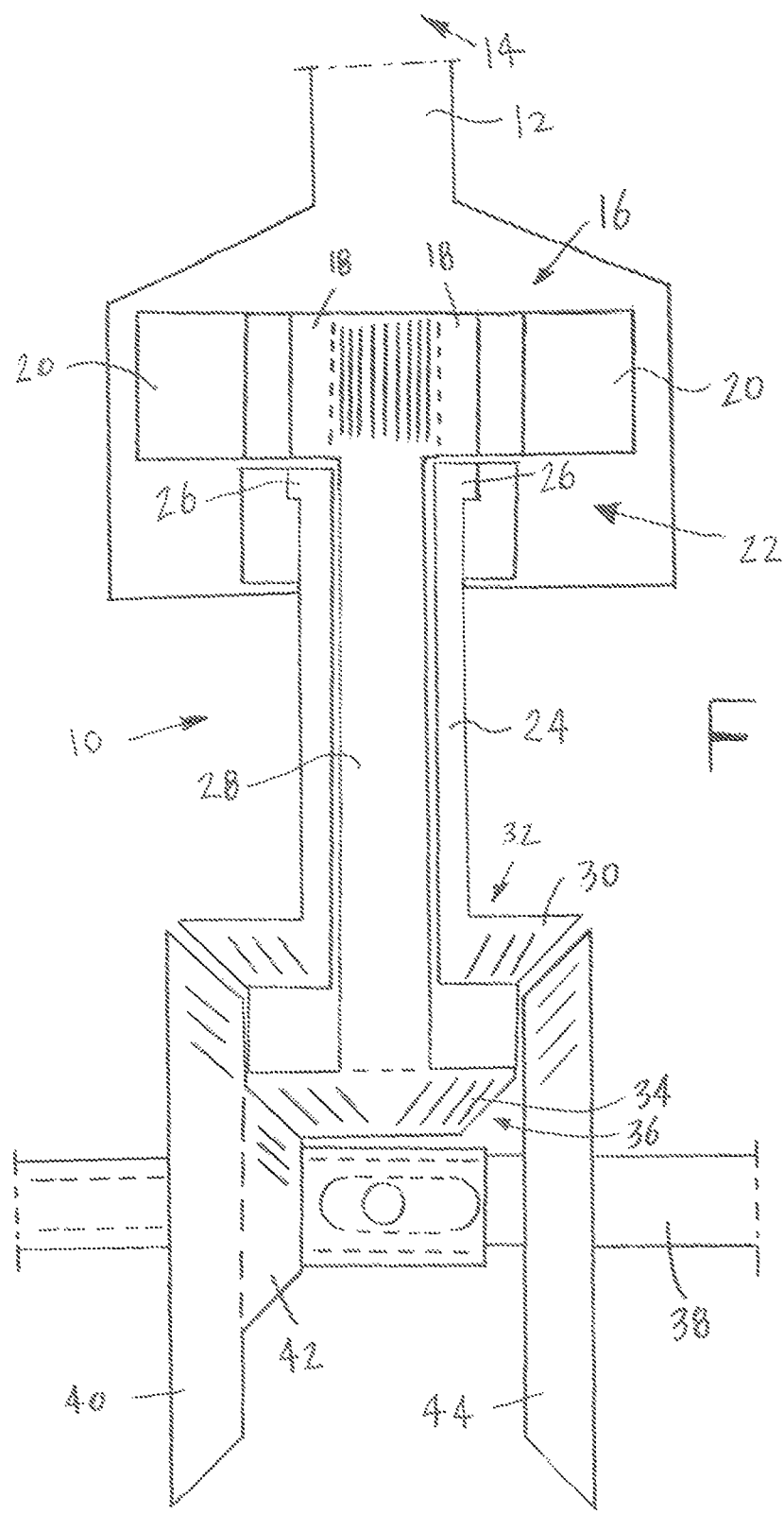
FIG. 1 is a partial cross-sectional view of a propeller driving assembly constructed according to the present disclosure.

Referring now to the drawings, wherein like numbers refer to like items, number 10 identifies a preferred embodiment of a propeller driving assembly constructed according to the present disclosure. With reference now to FIG. 1, the propeller driving assembly 10 is shown being connected to an input shaft 12 that is coupled to an engine 14. A one-way roller sprag clutch 16 is connected to the input shaft 12 and the clutch 16 has an inner race 18 and an outer race 20. A centrifugal release clutch 22 is connected to an outer shaft or standard driving shaft 24. The outer shaft 24 is used to drive the boat (not shown) in a forward direction or a reverse direction. The release clutch 22 also has a ratchet wheel 26 that is connected to the outer shaft 24. The input shaft 12 is also connected an inner shaft or overdrive shaft 28. The outer shaft 24 and the inner shaft 28 are coaxial. As will be explained in detail herein, the input shaft 12 initially rotates both the outer race 20 of the sprag clutch 16 and the ratchet wheel 26 of the release clutch 22. The release clutch 22 is used to release the outer shaft 24 once a particular or predetermined speed is reached. A bevel gear 30 is mounted to a lower end 32 of the outer shaft 24. Another bevel gear 34 is mounted to a lower end 36 of the inner shaft 28. The bevel gears 34 and 36 are used to operate or turn a propeller shaft 38 for moving a boat (not shown). The propeller shaft 38 may be driven in a forward direction when a forward low gear 40 or a forward high gear 42 is selected or in a reverse direction when a reverse gear 44 is selected.

Figure 2:
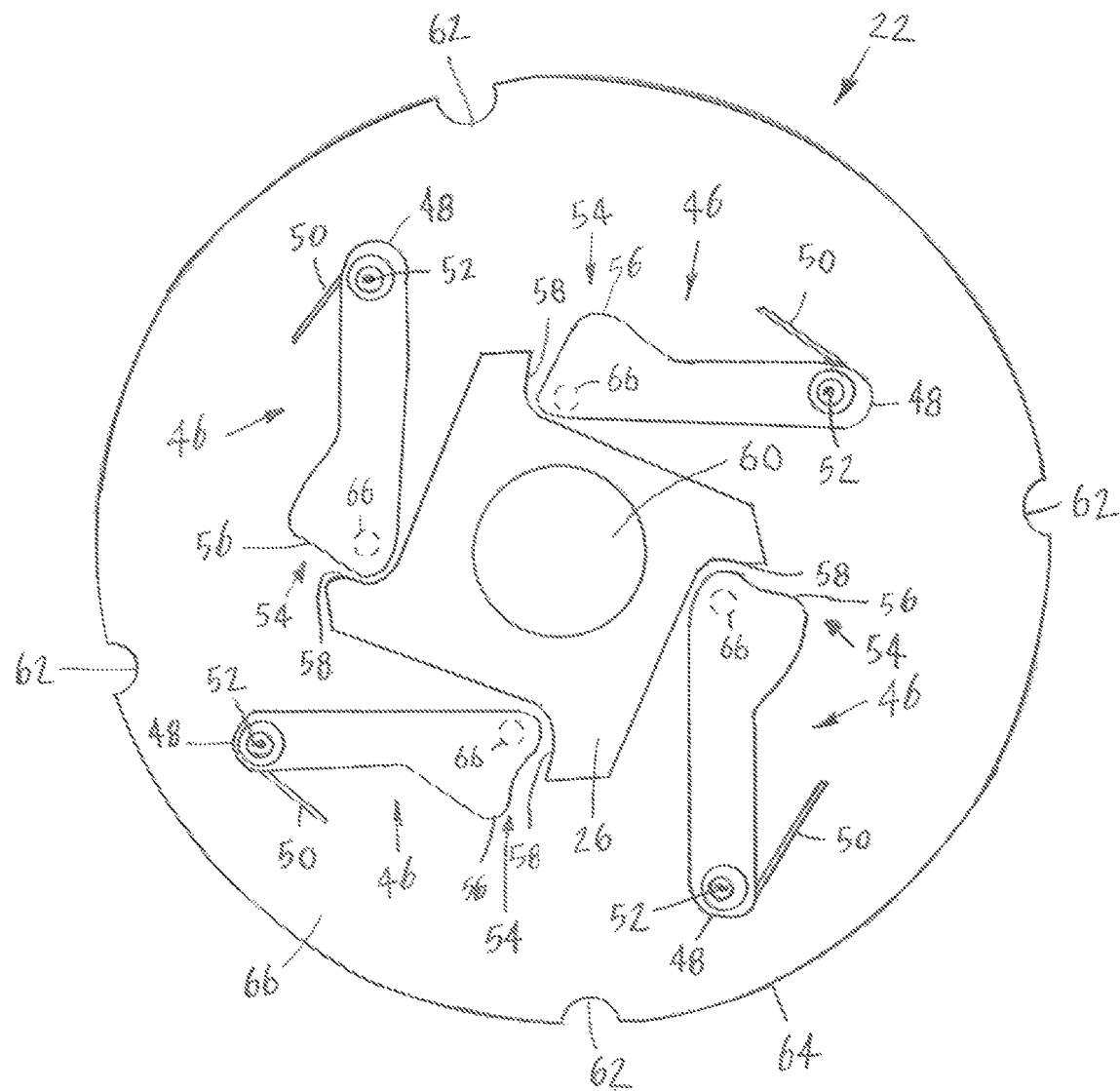
FIG. 2 is a top view of a release clutch of the propeller driving assembly.

FIG. 2 shows a top view of the centrifugal release clutch 22. With particular reference now to both FIGS. 1 and 2, the release clutch 22 comprises a number of flyweight mass assemblies 46 each having a first end 48 having a return torsion spring 50 and a hardened pin 52 and a second end 54 having a pawl 56 for fitting into a notch 58 associated with the a ratchet wheel 26. Although four flyweight mass assemblies 46 are depicted, it should be appreciated that more or less of the assemblies 46 may be employed depending upon the application. The ratchet wheel 26 has a center opening 60 through which the inner shaft 28 is inserted. The ratchet wheel 26 is also connected to the outer shaft 24. A number of inward dimples or lock pin slots 62 are positioned along an exterior edge 64 of a lower plate member 66. As the speed of the engine 14 increases, the pawls 56 disengage from the notches 58 in the ratchet wheel 26 which releases the outer shaft 24 and allows the inner shaft 28 to drive the bevel gear 34 to turn the propeller shaft 38. Since the inner shaft 28 is now driven by the input shaft 12 the bevel gear 34 allows the input shaft 12 to rotate the propeller shaft 38 at the same speed that the propeller shaft 38 had been rotating but with a slower speed of rotation of the input shaft 12. In this manner, the bevel gears 30 and 34 may be shifted automatically. Each of the flyweight mass assemblies 46 and the return torsion springs 50 can be engineered or designed to release or return at any specific RPM (revolutions per minute) release rate or speed. Each of the pawls 56 may also have a roller 66 (shown in phantom) which is used to assist in releasing or reengaging the pawl 56 to the notch 58 in the ratchet wheel 26.

By way of example only, the gear ratio of the engine 14 to the propeller shaft 38 may be 1.45 to 1 for the forward low gear 40 and the gear ratio of the engine 14 to the propeller shaft 38 may be 0.857 to 1 for the forward high gear 42. The forward low gear 40 may be used to provide for improved acceleration at low speeds.

Figure 3:
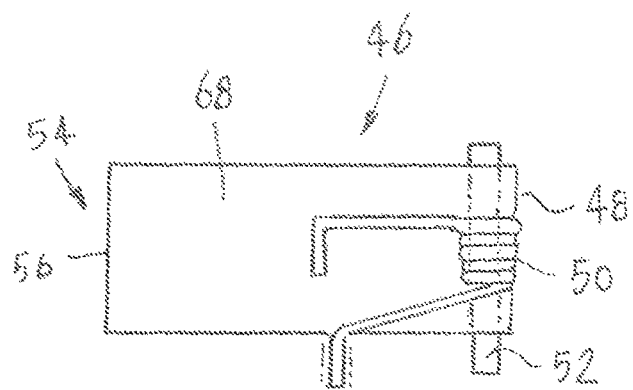
FIG. 3 is a side view of a flyweight mass assembly of the propeller driving assembly.

Referring now to FIG. 3, a side view of one of the flyweight mass assemblies 46 is shown. The flyweight mass assembly 46 has the first end 48 having the return torsion spring 50 through which is inserted the hardened pin 52. The second end 54 is configured in the shape of the pawl 56. The assembly 46 also has a body portion 68. As has been previously indicated, the mass of the assembly 46 may be designed to release the pawl 56 at any desired RPM and the twisting force of the return torsion spring 50 may also be designed to return the pawl 56 back into position so that the outer shaft 24 is engaged.

Figure 4:
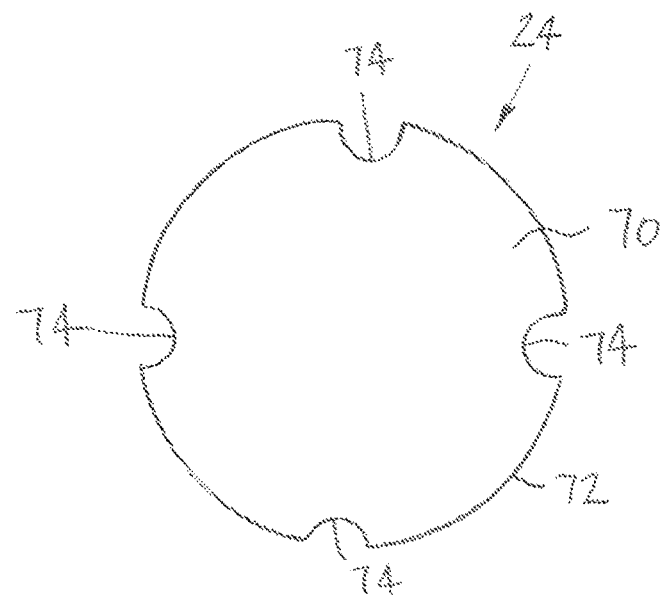
FIG. 4 is a bottom view of an outer shaft of the propeller driving assembly.

FIG. 4 illustrates a bottom view of the outer shaft 24. The outer shaft 24 has a circular plate member 70 having an outer edge 72 having a number of inward dimples or lock pin slots 74. The slots 74 are adapted to receiving the hardened pins 52 (not shown).

Figure 5:
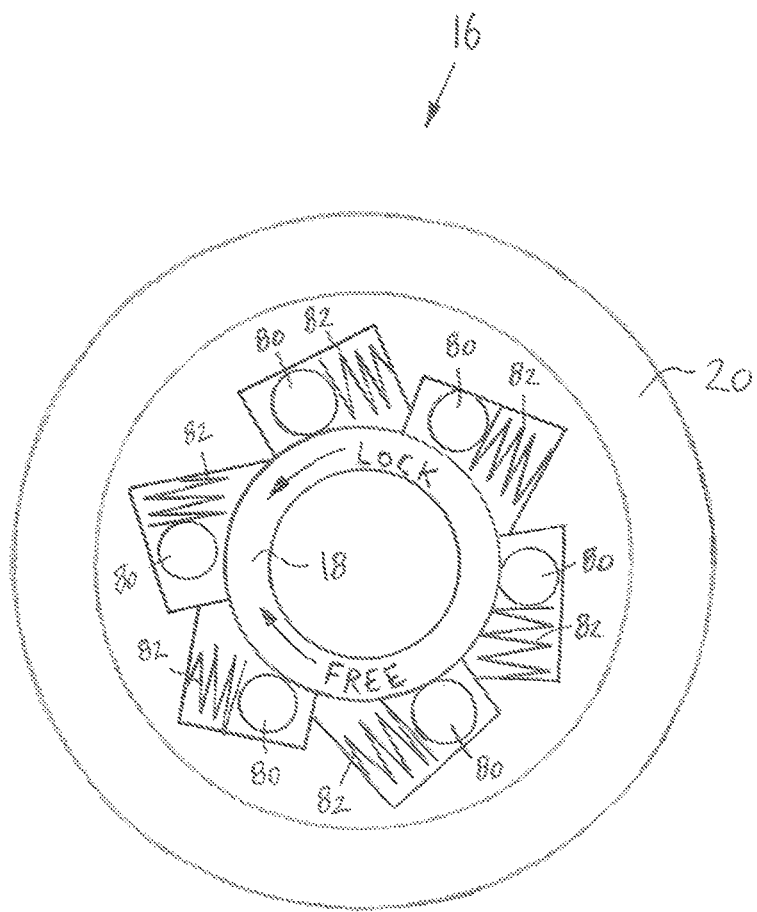
FIG. 5 is a top view of a roller sprag clutch of the propeller assembly.

With particular reference now to FIG. 5, a top view of the one-way roller sprag clutch 16 is shown. The roller sprag clutch 16 comprises the outer race 20, the inner race 18, roller sprags 80 which are biased by springs 82. The outer race 20 is splined or connected to the input shaft 12. The inner race 18 is splined or connected to the inner shaft 28. The inner race 18 is capable of rotation in one direction and being locked in place by the sprags 80 when attempting to rotate in the opposite direction. The clutch 16 is used to be able to smoothly change between the high gear 42 and the low gear 40 or movement of the outer shaft 24 and the inner shaft 26.

The propeller driving assembly 10 operates in the following manner. Initially, the input shaft 12 rotates both the outer race 20 of the one-way sprag clutch 16 and the ratchet wheel 26 of the centrifugal release clutch 22. In this condition, the inner shaft 28 freely spins inside the ratchet wheel 26 which also spins the inner race 18 of the clutch 16. The inner race 18 spins faster than the outer race 20. As the speed increases, the pawls 56 are released from the notches 58 of the ratchet wheel 26. Once released, the outer shaft 24 is no longer being driven by the input shaft 12 and the torque applied to the inner shaft 28 causes the spring biased roller sprags 80 to lock the inner race 18 and the outer race 20 together. The inner shaft 28 is now driven by the input shaft 12 through the sprag clutch 16 and the outer shaft 24 free wheels. As the speed decreases a point will be reached where the pawls 56 will reengage with the notches 58 of the ratchet wheel 26. At this point, the outer shaft 24 is reconnected to the input shaft 12. As the same time the spring biased sprags 80 release the inner race 18 and the inner shaft 28 is no longer being driven by the input shaft 12. The inner shaft 28 free wheels (over runs) along with the inner race 18.

From all that has been said, it will be clear that there has thus been shown and described herein a propeller driving assembly which fulfills the various objects and advantages sought therefor. It will be apparent to those skilled in the art, however, that many changes, modifications, variations, and other uses and applications of the subject propeller driving assembly are possible and contemplated. All changes, modifications, variations, and other uses and applications which do not depart from the spirit and scope of the disclosure are deemed to be covered by the disclosure, which is limited only by the claims which follow.

What is claimed is:

1. A marine propeller driving assembly for changing between first and second gear ratios connected to an input shaft that is coupled to an engine comprising:

a propeller shaft connected to a first bevel gear of larger diameter and to a second bevel gear of smaller diameter, said first and second bevel gears driven by outer and inner coaxial shafts respectively;

a roller clutch having an inner race and an outer race with the outer race connected to the input shaft;

a release clutch connected to the input shaft, the release clutch having a ratchet wheel having a notch and a flyweight assembly for engaging or disengaging the notch;

the outer shaft connected to the ratchet wheel of the release clutch and the outer race of the roller clutch, the outer shaft having a lower end driving the first bevel gear when the flyweight assembly engages the notch in the ratchet wheel in the first gear ratio;

the inner shaft connected to the input shaft and the inner race of the roller clutch, the inner shaft having a lower end driving the second bevel gear when the flyweight assembly is disengaged from the notch in the ratchet wheel in the second gear ratio.

2. The propeller driving assembly of claim 1 wherein the flyweight assembly further comprises a first end having a return torsion spring and a hardened pin and a second end having a pawl for engaging the notch.

3. The propeller driving assembly of claim 1 wherein the roller clutch is a one-way roller sprag clutch.

4. The propeller driving assembly of claim 1 wherein the ratchet wheel has a center opening through which the inner shaft is inserted.

5. The propeller driving assembly of claim 1 wherein the release clutch further comprises a lower plate member having an exterior edge having a number of lock pin slots formed in the exterior edge.

6. A marine propeller driving assembly for changing between first and second gear ratios connected to an input shaft that is coupled to an engine comprising:

a propeller shaft connected to a first bevel gear of larger diameter and to a second bevel gear of smaller diameter, said first and second bevel gears driven by outer and inner coaxial shafts respectively;

a one-way roller sprag clutch having an inner race and an outer race with the outer race connected to the input shaft;

a release clutch connected to the input shaft, the release clutch having a ratchet wheel having a number of notches and a number of flyweight assemblies each for engaging or disengaging the notches;

the outer shaft connected to the ratchet wheel of the release clutch and the outer race of the one-way roller sprag clutch, the outer shaft having a lower end driving the first bevel gear and the flyweight assemblies are engaged in the notches;

the inner shaft connected to the input shaft and the inner race of the one-way roller sprag clutch, the inner shaft having a lower end driving the second bevel gear when the flyweight assemblies are disengaged from the notches.

7. The propeller driving assembly of claim 6 wherein the outer shaft and the first bevel gear are capable of rotating the propeller shaft in a forward direction or a reverse direction.

8. The propeller driving assembly of claim 6 wherein the inner shaft and the second bevel gear are capable of rotating the propeller shaft in a forward direction.

9. The propeller driving assembly of claim 6 wherein each of the flyweight assemblies further comprises a first end having a return torsion spring and a hardened pin and a second end having a pawl for engaging one of the notches.

10. The propeller driving assembly of claim 6 wherein the outer shaft and the first bevel gear are capable of rotating the propeller shaft in a forward direction.

11. The propeller driving assembly of claim 6 wherein the outer shaft and the first bevel gear are capable of rotating the propeller shaft in a forward direction and a reverse direction and the inner shaft and the second bevel gear are capable of rotating the propeller shaft in a forward direction.

12. A marine propeller driving assembly for changing between first and second gear ratios connected to an input shaft that is coupled to an engine comprising:

a propeller shaft connected to a first bevel gear of larger diameter and to a second bevel gear of smaller diameter, said first and second bevel gears driven by outer and inner coaxial shafts respectively;

a one-way roller sprag clutch having an inner race and an outer race with the outer race connected to the input shaft;

a release clutch connected to the input shaft, the release clutch having a ratchet wheel having a plurality of notches and a plurality of flyweight assemblies with each of the flyweight assemblies for engaging or disengaging one of the notches with the flyweight assemblies being positioned on a lower plate member;

the outer shaft connected to the ratchet wheel of the release clutch and the outer race of the one-way roller sprag clutch, the outer shaft having a lower end driving the first bevel gear when the flyweight assemblies are engaged from the notches in first gear ratio;

the inner shaft connected to the input shaft and the inner race of the one-way roller sprag clutch, the inner shaft having a lower end driving the second bevel gear when the flyweight assemblies are disengaged from the notches in the second gear ratio.

13. The propeller driving assembly of claim 12 wherein each of the flyweight assemblies further comprises a first end having a return torsion spring and a hardened pin and a second end having a pawl for contacting one of the notches.

14. The propeller driving assembly of claim 12 wherein each of the flyweight assemblies disengage from each of the notches when the outer shaft reaches a predetermined speed of rotation.

15. The propeller driving assembly of claim 12 wherein the ratchet wheel has a center opening through which the inner shaft is inserted.

16. The propeller driving assembly of claim 12 wherein the lower plate member further comprises an exterior edge having a number of lock pin slots formed in the exterior edge.

17. The propeller driving assembly of claim 12 wherein each of the flyweight assemblies engages each of the notches when the outer shaft reaches a predetermined speed of rotation.

* * * * *